Sept. 18, 1934.     J. W. MARRINAN     1,973,990

BLEEDING AND DEFIBRINATING APPARATUS

Filed April 23, 1930     2 Sheets—Sheet 1

Inventor
James W. Marrinan

By Caswell & Lagaard
Attorneys

Sept. 18, 1934.   J. W. MARRINAN   1,973,990
BLEEDING AND DEFIBRINATING APPARATUS
Filed April 23, 1930   2 Sheets-Sheet 2
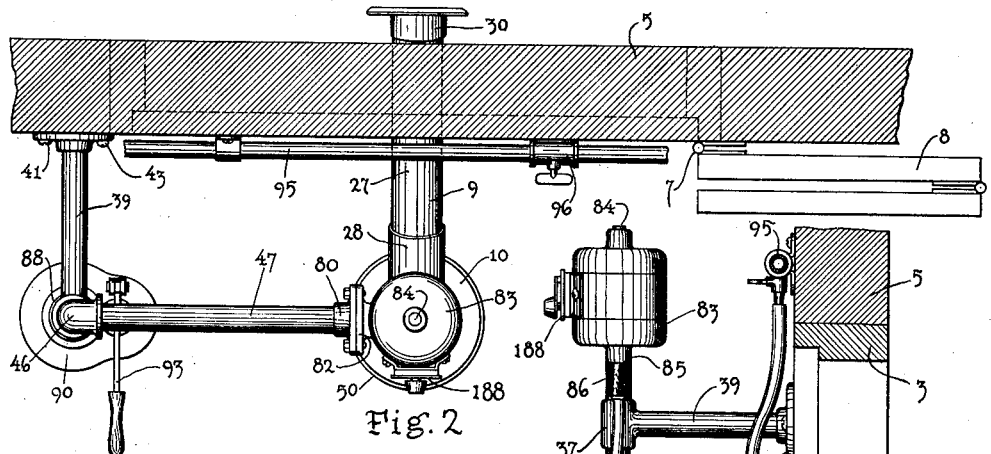
Fig. 2
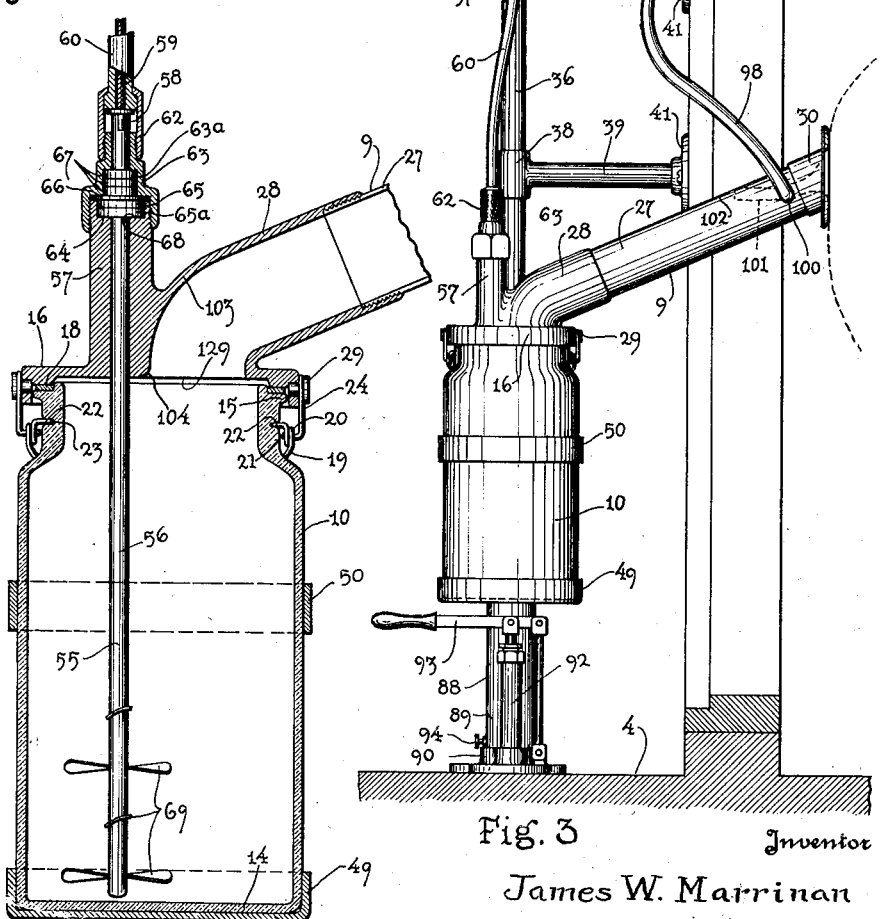
Fig. 3
Fig. 4
Inventor
James W. Marrinan
By Caswell & Lagaard
Attorneys

Patented Sept. 18, 1934

1,973,990

UNITED STATES PATENT OFFICE 1,973,990

BLEEDING AND DEFIBRINATING APPARATUS

James W. Marrinan, St. Paul, Minn., assignor, by direct and mesne assignments, to Edgar A. Poe, St. Joseph, Mo.

Application April 23, 1930, Serial No. 446,494

5 Claims. (Cl. 128—276)

My invention relates to the method of and apparatus for procuring blood from animals and treating it for medical and similar purposes.

Another object of the invention resides in providing a method of separating the fibrin from blood which consists in agitating an accumulating supply of blood in a manner to circulate the same within a container in which it is being collected and in beating the accumulating quantity of blood uniformly.

A feature of the invention resides in providing a method of procuring and treating blood in which the flow of blood from an aimal is stimulated under vacuum and the blood acted upon under vacuum during the accumulation thereof.

Another object of the invention resides in providing a device comprising a container having a tubular member communicating therewith for application to the animal to be bled and further comprising an agitator within said container for agitating the blood as it accumulates therein.

An object of the invention resides in providing said container with a head and in connecting the tubular member thereto and in further journaling in said head a shaft extending into said container and having an agitator thereon for beating and circulating the blood collected within the container to separate the fibrin from the blood.

Another object of the invention resides in constructing the agitator with a number of superimposed blades adapted to beat the blood and cause it to circulate downwardly about the agitator and upwardly at the walls of the container.

A still further object of the invention resides in providing a supporting structure for the container, whereby the container may be freely moved to conform with the movements of the animal to which the device is applied.

A feature of the invention resides in providing a motor for operating the agitator and in mounting the motor and container on a common movable supporting structure.

An object of the invention resides in constructing the supporting structure with means for swingably mounting the same at the locality in which the device is to be used, whereby said structure with its supported container and associated parts may be swung from operative position into inoperative position, allowing freedom of access to the animal and to said container and parts.

Another object of the invention resides in mounting the swingable supporting structure for vertical movement and in providing means for raising and lowering said structure.

Other objects of the invention reside in the novel combination and arrangement of parts and in the details of construction hereinafter illustrated and/or described.

In the drawings:

Fig. 2 is a plan view of the structure shown in Fig. 1.

Fig. 3 is an elevational sectional view taken on line 3—3 of Fig. 1.

Fig. 4 is an elevational sectional view of the container taken on line 4—4 of Fig. 1, and drawn to a somewhat larger scale.

Figure 1:
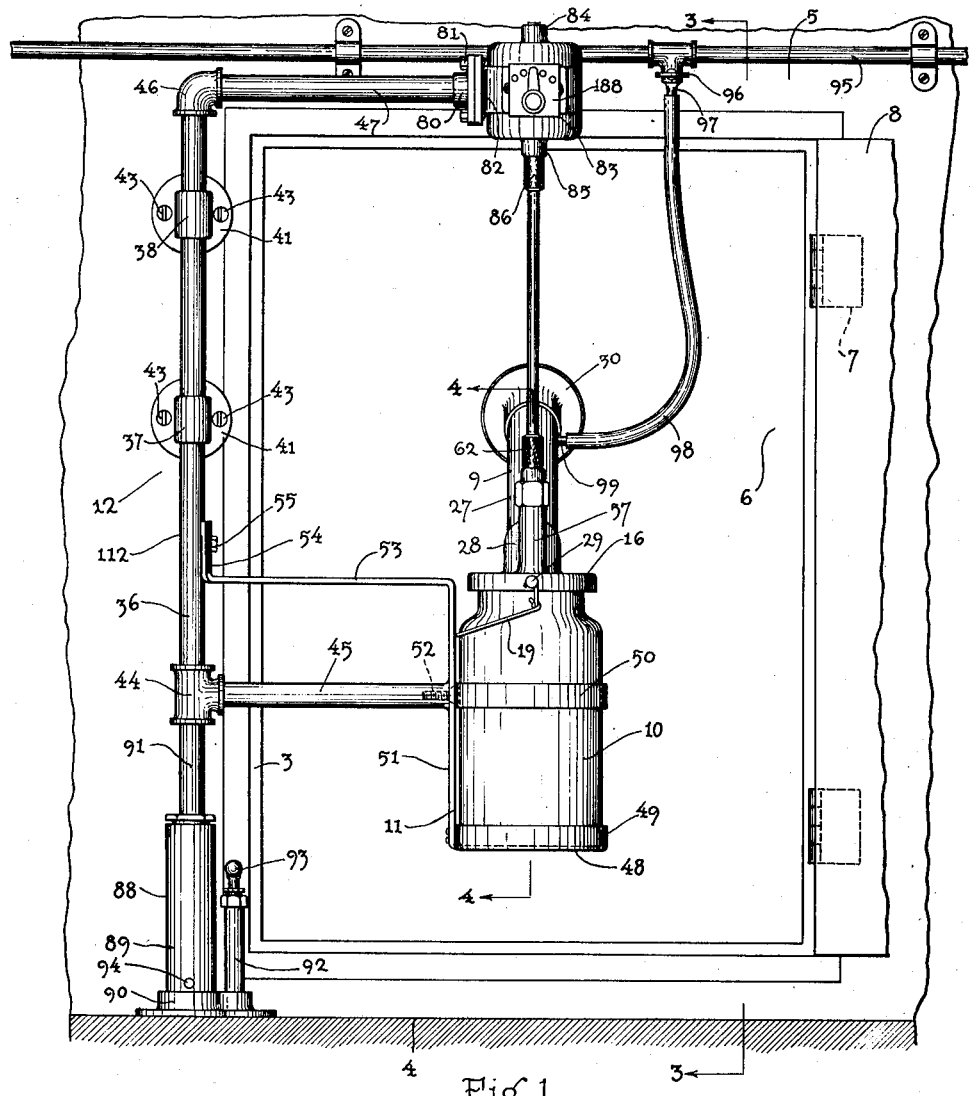
Fig. 1 is an elevational view of a portion of a building illustrating the application of an embodiment of my invention thereto.

In procuring blood for medical and other purposes as by bleeding hogs, a customary practice has been tail bleeding. In such method, a device is used comprising a container having a tubular horn feeding thereto which is adapted to be connected with a vacuum pump. In the use of this device, the tip of an animal's tail is clipped, the tail being inserted into the horn, and the open end of the horn brought up against the animal's rump to form a seal. Due to the partial vacuum created within the container and communicating horn, the flow of blood from the animal is stimulated, the blood being collected in the receptacle. After sufficient blood has been taken from the animal, the pressure is reduced to normal and the device is removed from the animal. In order to separate the fibrin from the blood, the blood, open to the atmosphere, is agitated with a paddle until separation occurs. In such method, it is necessary for the attendant to hold the receptacle and horn in position with reference to the animal, while the bleeding is taking place and, at the same time, to agitate the blood by shaking the receptacle as vigorously as possible while the device is applied to the animal. Such procedure is exceedingly laborious and in spite of endeavors of the attendant to agitate the blood while being collected, blood clots are formed. In addition, considerably more time is required where the fibrin is separated from the blood after the bleeding has been completed.

The present invention provides a method and apparatus, whereby the bleeding and separation of the fibrin are continuously carried on at the same time and in such manner as to entirely preclude the formation of blood clots, so as to leave the blood in proper condition for use for the purposes desired.

For the purpose of illustrating the application of my invention, I have shown a portion of a wall 5 of a building together with the floor 4 thereof. In buildings constructed for the purpose of producing serums, the building is preferably constructed to provide adjoining rooms, separated as by the wall 5, one room being used to house the animals to be bled and the other room used for collecting the blood and treating the same. In the animal room are formed suitable stalls in which the animals are placed, and the wall 5 is formed with openings 6 communicating with the stalls. Each of these openings is provided with a frame 3 adapted to be closed by folding doors 8 swung on hinges 7. When an animal is to be bled, it is placed in a suitable crate which is moved up to the opening 6, the doors 8 being swung back as shown in Fig. 2.

The illustrated form of apparatus for carrying out my improved process comprises a container 10 which is in communication with a tubular horn 9 adapted to be applied to an animal during the bleeding process. The container 10 is mounted in a cradle 11 carried by a supporting structure indicated in its entirety at 12 (Fig. 1) so that the container need not be held by the operator. Said container is free to turn on its axis or, in other words, swivel within the cradle and the supporting structure is itself movable by swinging so that the horn 9 may follow the movements of the animal during the bleeding process and thus prevent the accidental breaking of the seal between said horn and the animal's rump, due to restlessness of the animal.

Figure 5:
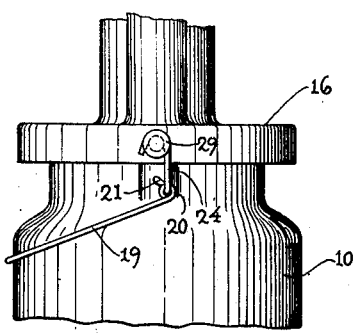
Fig. 5 is an enlarged fragmentary elevational view of a portion of the container.

The container 10 may be of any suitable construction, a cylindrical glass jar having a large open neck as at 15 being preferred. This container is closed by a removable closure or head 16 which seats upon the upper edge of the neck 15. A gasket 18 is disposed between said head 16 and neck 15 to effect a tight closure therebetween. The head 16 is detachably held in place on the container 10 through a device clearly shown in Figs. 4 and 5. This device comprises a wire bail 19 formed near its ends with eyes 20, arms 21 and terminal pins 22 extending inwardly from said arms. These pins are received within sockets 23 in the neck 15 on opposite sides thereof and by means of said pins the bail 19 is pivotally attached to the container proper. Two links 24 are pivoted to the eyes 20 of the bail 19 and terminate in hooks by means of which they may be hooked over headed studs 29 at the sides of the head 16. The arms 21 of the bail 19 serve as levers for drawing the links 24 downwardly to force the cap or head 16 into closed position upon the neck 15. When the bail 19 is depressed as shown in Fig. 5, the axis of the eyes 20 lies at one side of the axis of the pins 22 which maintains the attaching device in locked position with the cap 16 securely clamped upon the container 10.

The horn 9 includes a tube 27 issuing from a tubular fitting 28 formed on the head 16. A flanged member 30 at the end of tube 27 communicates with the bore of said tube and is adapted to receive the animal's tail and to bear against the animal's rump, when the device is in use.

Within the container 10 is disposed an agitator indicated in its entirety at 55. This agitator comprises a vertically positioned shaft 56 which extends through a boss 57 in the head 16 and is journaled therein. This shaft 56 is disposed to one side of the axis of the container 10 and the fitting 28 to which the horn 9 is attached is disposed to the other side thereof so that the opening 129 in said fitting is wholly unobstructed.

To form an air tight joint between the shaft 56 and its bearing in the boss 57, I employ a stuffing box gland member such as indicated at 63. The stuffing box construction includes a bore 64 in the upper end of the boss 57 which provides a shoulder 68. A shoulder 65 on the shaft 56, formed with a fibre facing 65$^a$, fits within the bore 64, the facing 65$^a$ bearing upon the shoulder 68 of the boss 57. A washer gasket 66 superimposing the shoulder 65 of the shaft 56 is clamped at its outer margin between the boss 57 and gland member 63, compression washers 67 of felt, surrounding the shaft 56 and seated in a bore 63$^a$ in the packing gland 63, serving to bear yieldingly against the washer gasket 66 and perfect the air seal about said shaft 56.

The shaft 56 extends through the boss 57 and is formed at the extreme end thereof with a slot 58 by means of which a flexible shaft 59 may be connected therewith. The shaft turns in a flexible tube 60 secured to the end of the gland member 63 by means of a screw nipple 62. Owing to this construction, the shaft 59 may be readily connected to or disconnected from the shaft 56 and the gland member 63 may be readily removed from the boss 57 and shaft 56 together with the gasket washer 66 and compression washers 67.

The shaft 56, as illustrated, extends to within a short distance of the bottom 14 of container 10. This shaft has attached thereto, at various elevations, a number of beating and propelling blades 69. As the shaft 56 rotates, the blades 69 beat the blood as it accumulates within the container 10, the lowermost blades becoming active upon the initial accumulation. In addition to the beating of the blood for the purpose of defibrinating the same, said blades keep the blood in circulation, thus preventing the formation of clots and insuring a uniform beating action.

The supporting structure 12 includes a frame indicated in its entirety at 112. This frame comprises a standard 36, preferably in the nature of a tube or rod which is slidably and rotatably supported in two bearings or guides 37 and 38. These bearings are secured to short struts 39 (Fig. 3) having attached to the ends thereof flanges 41 which are bolted to the wall 5 through bolts or lag screws 43 to support the bearings 37 and 38 at the proper elevation. At the lower end of the standard 36 is provided a T 44 which has attached to it an arm 45 extending outwardly therefrom and at right angles thereto. At the upper end of the standard 36 is provided an L 46 which has screwed into it another arm 47 extending outwardly from said standard in the same direction as the arm 45 and superimposing said arm.

The cradle 11, previously referred to, is carried by the arm 45. This cradle comprises a base 48 formed with an upwardly turned flange 49 within which the lower end of the container 10 may rest. The said cradle further includes an encircling band 50 disposed above the flange 49 in concentric relation with respect thereto. Both the flange 49 and the band 50 are secured to an upright 51 which, in turn, is secured to the arm 45 through a screw 52. The upright 51 has connected to it a brace 53 formed with a leg 54 seated against the standard 36 and secured thereto by means of a screw 55. In this construction, the cradle 11 is rigidly attached to the arm 45 and standard 36 so as to properly support the container 10.

Secured to the outer end of the arm 47 is a flange 80 which has attached to it through bolts 81 a mounting 82. An electric motor 83 is attached to said mounting and is arranged with its shaft 84 extending vertically. The lower end of this shaft is connected to the flexible shaft 59 in any suitable manner and the tube 60 in which said shaft rotates is similarly attached to the bearing 85 of said motor through a suitable coupling 86. By means of this construction, the agitator 55 may be readily driven from said motor. For the purpose of controlling the speed of the motor 83, a rheostat or other speed control device 188 is employed which may be directly mounted upon said motor where the same is readily accessible to the operator.

Due to the mounting of the standard 36 of the frame 112 in the bearings 37 and 38, the container 10, together with the motor 83 for operating the same, may be swung about said bearings or raised and lowered with respect thereto to permit of the ready application of the horn to the animal in a manner readily to receive the animal's tail.

For the purpose of raising and lowering the entire frame structure, a jack is employed which is indicated in its entirety at 88. This jack is preferably of the hydraulic type and is provided with a cylinder 89 mounted upon a base 90 resting directly on the floor 4. A piston rod 91 having the usual piston attached thereto is connected with the T 44 of the frame 112 and extends into the cylinder 89 where the said piston may operate in the usual manner. A pump 92, also mounted upon the base 90 and provided with an operating handle 93, serves to force the liquid utilized in the jack into the cylinder chamber so as to elevate said piston and the entire frame structure carried thereby, including the container 10 and the motor 83. By operating a relief valve 94, the liquid within the cylinder 89 may be discharged therefrom to permit the frame 112 to descend. Inasmuch as the jack 88 per se forms no feature of the invention, I have not shown the same in detail, though it can readily be comprehended that any suitable jack may be employed for the purpose, either hydraulic or mechanical, as desired.

The horn 9 of the container 10 is adapted to be connected with an exhaust or vacuum pump for the purpose of exhausting the air from the container 10 and thereby hastening the flow of blood from the animal in the bleeding process. For this purpose a pipe line 95 is employed which is mounted on the wall 5 immediately above the openings 6 therein. This pipe line is connected to an exhaust pump or vacuum pump, not shown. The pipe line 95 is fitted at suitable intervals with valves 96, each of which is formed with a suitable nipple 97 by means of which a hose 98 may be removably connected thereto. The hose 98 is fitted with a nipple 99 adapted to be removably seated in an aperture in the tube 27 of the horn 9, as designated at 100 in Fig. 3. When the valve 96 is turned on, the interior of the container 10 and the horn 9 are placed in communication with the pipe line 95 and exhausted in the usual manner.

In the operation of the device, the animal's tail is first clipped and the horn 9 placed over the stump in such a manner as to bring the flanged member 30 into engagement with the rump of the animal. In thus applying the horn, the frame 112 is raised or lowered through the jack 88 and is swung bodily toward the opening 6, the container 10 being turned within the cradle 11, all as may be necessary to bring the member 30 of said horn into proper position with respect to the animal. The tube 98 is next connected through nipple 99 with the horn 9, air being then exhausted therefrom and from container 10 by turning on the valve 96. As shown in the drawings, in dotted lines in Fig. 2, the horn 9 is so disposed that the animal's tail, which is designated at 101 engages at its severed end the upper portion of the inner wall of tube 27. The blood issuing from the tail follows along this upper portion of said surface and along the inner curved surface 103 (Fig. 4) of the fitting 28 and into the container proper. Upon entering said container, the blood follows along the surface 104 of head 16 to the shaft 56. Thence, the blood flows down said shaft to the uppermost blades 69 of the agitator 55, whence it is thrown outwardly against the sides of the container. When the level of the accumulating blood ascends to the lowermost blades 69, these blades beat the blood and propel it in a circulatory manner, first driving it downwardly against the bottom 14 of the container, thence outwardly along the side walls thereof, thence upwardly along said walls and, finally, back to the agitator shaft. In this connection, it will be understood that the blades 69 at different elevations become active successively, as the level of the accumulating blood continues to rise. This action of the blades upon the blood prevents the formation of clots therein and causes the fibrin within the blood to become separated therefrom, which fibrin may be strained from the blood in the customary manner after the operation is completed. In the vacuum or partial vacuum within the horn 9 and communicating container 10, the tendency of clotting in the blood is minimized and this vacuum results in stimulating the bleeding of the animal. Further stimulation of the bleeding is effected through the vibration of the motor 83 and the associated parts driven thereby. The motor 83 and container 10, being carried by the supporting structure 112, which is free to swing horizontally on its bearings 37, 38, it follows that more or less of the vibration set up by the motor 83, shaft 59 and agitator 56 will be transmitted to the flanged member 30 of the horn 9. This member 30, abutting against the rump of the animal at the base of its tail, effects a massaging action, which, in itself, produces an active flow of blood from the clipped tail.

Due to the manner in which the container 10 is supported, the horn 9 may follow the movements of the animal without breaking the seal between the member 30 and the animal's body. As the animal moves from side to side, the container 10 swivels freely within the cradle 11 and, as the animal moves forwardly or rearwardly, the entire frame 112 swings forth or back on the bearings 37 and 38. In this manner, it becomes unnecessary for the operator to hold the container in place during the extraction of the blood and less attention is required than in the old method. Due to the action of the agitator 55, the fibrin is separated from the accumulating blood during the process of its extraction, the clotting of the blood being prevented at the same time. Thus, there is no necessity of shaking or swinging the container manually during the extraction of the blood to prevent clotting, nor is there any occasion, after the extracting process, of beating the blood to separate the fibrin therefrom.

My invention is highly advantageous in that it provides a method and apparatus, whereby the procedure in procuring blood from animals through the bleeding process and the eliminating of the fibrin therefrom is greatly simplified and expedited. The forming of blood clots is entirely prevented so that the total amount of the blood removed is usable. The apparatus is designed to prevent injury thereto through actions of the animal and so that movement of the animal will not break the seal between the horn and the animal's body. The device is exceedingly simple and reliable in operation and may be readily cleaned and sterilized as the occasion requires.

Changes in the specific form of my invention, as herein described, may be made within the scope of what is claimed without departing from the spirit of my invention.

Having described my invention, what I claim as new and desire to protect by Letters Patent is:

1. Apparatus of the character described comprising a support, a standard revoluble and vertically adjustable with respect to said support, an arm issuing from said standard, a container carried by said arm and having a conduit feeding thereto adapted to be applied to an animal to be bled, an agitator within said container, a second arm issuing from said standard, a motor attached to said second arm and connected with said agitator for driving the same, and means at the lower end of the standard for bodily raising and lowering said standard, container and motor.

2. Blood collecting and treating apparatus comprising a container, a tubular feeding horn fitted to the container and adapted to be applied to an animal to be bled, an agitator within the container for beating the blood accumulating therein, and a support, the container being floatingly carried thereby.

3. Apparatus of the character described comprising a frame capable of swinging on a vertical axis and also of being moved vertically, a container carried by said frame and having a conduit feeding thereinto adapted to be applied to an animal to be bled, and an elevating and lowering jack supporting said frame and supplying a swivelling footing therefor at the axis of the frame.

4. In an animal bleeding and defibrinating apparatus, a support, a container carried by said support, a suctional drainage member connected with the container and adapted for abutment against an animal to be bled, an agitator within said container for agitation of the blood delivered thereto, and means to drive said agitator.

5. In an animal bleeding and defibrinating apparatus, a base, a horizontally and vertically adjustable support on said base, a container on said support, a suctional drainage member communicating with the container and adapted for abutment against an animal to be bled, and mechanically-operated means within the container for defibrinating the blood delivered thereto by the drainage member.

JAMES W. MARRINAN.